United States Patent Office 3,341,719
Patented Sept. 12, 1967

3,341,719
THERMIONIC CONVERTER HAVING A HYDROGEN PERMEABLE SURFACE ON THE ANODE
Friedrich Burhorn, Erlangen, Georg Kanzler, Nurnberg, and Hildegard Schaufler, Erlangen, Germany, assignors to Siemens-Schuckertwerke Aktiengesellschaft, Berlin-Siemensstadt, Germany, and Erlangen, Germany, a corporation of Germany
Continuation of application Ser. No. 280,499, May 10, 1963. This application July 13, 1966, Ser. No. 565,018
Claims priority, application Germany, May 12, 1962, S 79,425
4 Claims. (Cl. 310—4)

This application is a continuation of application Ser. No. 280,499, filed May 10, 1963, now abandoned.

Our invention relates to thermionic converters and particularly to a thermionic converter having means for reducing the partial hydrogen pressure in its interior.

In thermionic converters heated by flame gases the hydrogen in the gas flames diffuse through the cathode into the interior of the converter, thus detrimentally affecting the vacuum which it is necessary to maintain between the anode and cathode of such converters.

It is an object of our invention to provide means eliminating or removing the undesired hydrogen adversely affecting the vacuum from the interior of the converter.

According to a feature of our invention we effectively provide a valve outlet for the hydrogen in the converter by making a portion of the boundary between the interior of the converter and the atmosphere of a material highly permeable to gas.

Other objects and advantages of the invention will be explained or will become evident from the following description of the prior art as well as a structure embodying features of the invention when taken in connection with the accompanying drawing wherein.

Figure 1:
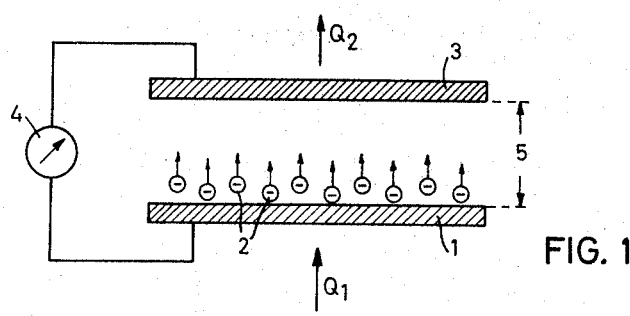
FIG. 1 is a schematic diagram generally illustrating the operation of a converter.

Basically, a thermionic converter is composed of plate-shaped electrodes such as diagrammatically illustrated in FIG. 1. A cathode 1 is heated with the heat quantity $Q_1$ to emit electrons 2. These electrons travel to a collector subjected to a cooling action, namely to the anode 3 which dissipates the heat $Q_2$ to its surrounding environment. The voltage thus obtained is measurable by means of a probe device 4. The plates 1 and 2 are insulated with respect to each other and spaced from each other by a distance of approximately 0.02 to 1 mm. The space 5 between the electrodes is either evacuated or subjected to a very small caesium vapor pressure. The high cathode temperature accompanied by the gas premeability of the materials renders difficult the maintenance of the vacuum within the internal chamber of the converter.

Essentially, gases diffuse through certain materials, especially at increased temperatures, due to the tendency of the molecules to distribute themselves evenly over the entire available space. If this space is subdivided into two volumes by a partition through which the molecules can pass, diffusion therethrough will take place. With predetermined environmental conditions, the rate of such diffusion is inversely proportional to the square root of the molecular weight of the gas. Being a light gas, hydrogen will diffuse the fastest through porous partition walls and it will even diffuse with relative ease through iron, platinum, or palladium. In the diffusion equation $$D = D_0 \frac{1}{d} \cdot p^{1/2} \cdot e^{-\frac{E_0}{2RT}}$$

describing this process, D denotes the gas quantity diffused under normal conditions in cubic centimeters per second through a metal layer having a thickness of 1 mm. and a surface area of 1 cm.$^2$.

$E_0$ is expressed in Kcal./gram molecule,
P is the gas pressure in Torr,
d is the thickness of the metal layer in mm.,
R is the gas constant, and
T is the absolute temperature.

The following table lists the constants $E_0$ and $D_0$ in several hydrogen-metal systems.

| System | $E_0$ | $D_0$ |
|---|---|---|
| $H_2$-nickel | 30,840 | $2.3 \cdot 10^{-2}$ |
| $H_2$-platinum | 39,200 | $1.4 \cdot 10^{-2}$ |
| $H_2$-palladium | 8,400 | $4.1 \cdot 10^{-2}$ |
| $H_2$-iron | 19,200 | $1.63 \cdot 10^{-3}$ |

As stated, in a thermionic converter heated by flame gases, the hydrogen contained in the gas flames diffuses through the cathode into the interior of the converter and it is the object of the present invention to eliminate or remove the undesired hydrogen which adversely affects the vacuum, from the interior of the converter.

According to the present invention we construct the boundary surface between the interior of a thermionic converter and atmosphere at least in part from materials having a high specific permeability to gas, thereby allowing for outward diffusion of hydrogen. This provides for a unidirectionally controlled diffusion path from the flame chamber through the interior of the converter and to atmosphere. Due to its slight molecule size and molecular weight, hydrogen will exhibit a faster rate of diffusion than other gases, so that there is practically no risk of air, i.e. oxygen and nitrogen molecules, penetrating into the evacuated interior in the opposite direction, namely from the atmosphere via the converter to the interior. Thus, we achieve a valve effect.

Figure 2:
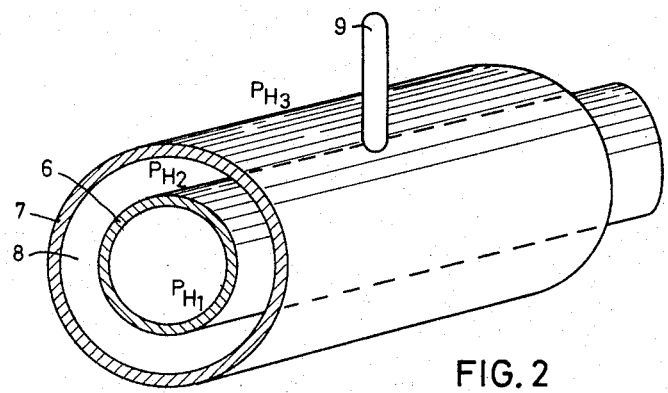
FIG. 2 is a sectional perspective of portions of a converter embodying features of the present invention.

In FIG. 2, a cylindrical thermionic converter according to the invention comprises an inner cylinder 6 of 2 mm. thick molybdenum constituting a gas-flame-heated cathode, and an outer cylinder constituting an anode 7. These electrodes 6 and 7 form an interior chamber 8 with insulating wall means not shown. The hydrogen contained in the combustion gases within the interior of the cathode cylinder is at a partial pressure $p_{H1}$. In view of the high cathode temperatures the hydrogen will diffuse through the molybdenum cathode material, into the interior of the evacuated converter chamber 8, thereby continuously deteriorating the vacuum. The partial pressure prevailing in the interior is $p_{H2}$. A palladium tube 9 having a diameter of 2 to 3 mm. is mounted on an opening in the anode 7 for reducing the partial pressure. The tube has a height between 10 and 15 mm., possesses a closed end, and is constructed of palladium sheet material having a thickness of 0.5 mm. The tube is at anode temperature in the range of 300 to 600° C. At such temperatures palladium exhibits a high permeability to hydrogen. As the partial pressure $p_{H3}$ in the surrounding atmosphere is low ($p_{H3} < p_{H2}$), the hydrogen will diffuse from the interior of the converter through the palladium tube and into atmosphere.

Figure 3:
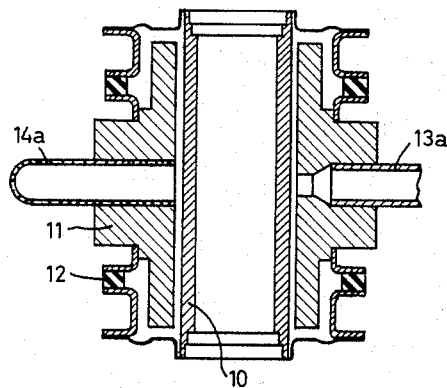
FIG. 3 is a sectional view of portions of another converter embodying features of the present invention.

FIG. 3 shows a cross-sectional view of another embodiment of a thermionic converter having a cylindrical design; 10 denotes the cathode, 11 the anode, 12 an insulating ring, 13 a pump tube, and 14 a palladium tube.

Also contemplated by the present invention are a plurality of palladium tubes on the anode of FIGS. 2 or 3. Another material whose use is contemplated in place of palladium to achieve the desired permeability with respect to hydrogen, is niobium. Moreover the invention is not limited to diffusion tubes but may employ other suitable structures, such as metal sheets inserted into apertures or recesses provided in the anode.

While embodiments of the invention have been described in detail it will be obvious to those skilled in the art that the inventon may be practiced otherwise.

We claim:

1. An evacuated and enclosed thermionic converter comprising cathode means having opposed surfaces, one of said surfaces being heated by hydrogen-bearing flame gas, and anode means having inner surface spaced from the other anode surface and an outer surface, said anode means being maintained at a temperature in the range of 300° to 600° C., and a boundary surface means located on said outer surface of said anode means exposed to the surrounding atmosphere, said boundary surface means consisting of material having a high specific permeability to hydrogen at temperatures ranging between 300° to 600° C. and being selected from the group of materials consisting of palladium and niobium, to allow for outward diffusion of hydrogen from the flame gas through said cathode means and anode means.

2. Thermionic converter according to claim 1, wherein said anode means and said cathode means define an evacuable chamber therebetween and said cathode means are heated by the hydrogen-bearing flame gas from outside of said chamber.

3. Thermionic converter according to claim 1, wherein said boundary surface means has a tubular configuration secured at one end to said anode means and terminating in a dome at the free end thereof.

4. Thermionic converter according to claim 1, wherein said cathode means comprises an inner tubular member and said anode means comprises an outer tubular member coaxially surrounding and spaced from said inner tubular member, said hydrogen-bearing flame gas being located in said inner tubular member.

No references cited.

MILTON O. HERSHFIELD, *Primary Examiner.*

J. W. GIBBS, *Assistant Examiner.*